United States Patent [19]

Sasaki et al.

[11] Patent Number: 5,232,972

[45] Date of Patent: Aug. 3, 1993

[54] ADHESIVE COMPOSITION

[75] Inventors: Kozo Sasaki; Toshihiro Yotsumoto, both of Tokyo, Japan

[73] Assignee: Bridgestone Corporation, Tokyo, Japan

[21] Appl. No.: 860,238

[22] Filed: Mar. 27, 1992

Related U.S. Application Data

[63] Continuation of Ser. No. 574,618, Aug. 29, 1990, abandoned.

[30] Foreign Application Priority Data

Aug. 31, 1989 [JP] Japan .................................. 1-223016
Jun. 20, 1990 [JP] Japan .................................. 2-161963

[51] Int. Cl.$^5$ .............................................. C08L 9/04
[52] U.S. Cl. .................................... 524/458; 525/142; 525/154; 525/157
[58] Field of Search .......................................... 524/458

[56] References Cited

U.S. PATENT DOCUMENTS 4,305,859 12/1981 McEwan et al. .................... 524/458
4,569,963 2/1986 Hisaki et al. ......................... 524/458

FOREIGN PATENT DOCUMENTS 58-2370 1/1983 Japan .
1-49308 10/1989 Japan .

Primary Examiner—John C. Bletuge
Assistant Examiner—Mark Sweet
Attorney, Agent, or Firm—Sughrue, Mion, Zinn, Macpeak & Seas

[57] ABSTRACT

An adhesive composition comprising a mixture of
  (1) a latex having a double construction of vinylpyridine-styrene-butadiene terpolymer prepared by
    (A) polymerizing a monomer mixture comprising 30–60 wt % of styrene, 0.5–15 wt % of vinylpyridine and less than 60 wt % of butadiene and then
    (B) polymerizing a monomer mixture comprising 10–40 wt % of styrene, 5–20 wt % of vinylpyridine and 45–75 wt % of butadiene, and with the styrene content by percentage in (B) being less than that in (A) and
  (2) 10–30 parts on a solids basis of a thermosetting resin based on 100 parts on a solids basis of said latex (1).

14 Claims, No Drawings

ADHESIVE COMPOSITION

This is a continuation of application Ser. No. 07,574,618 filed Aug. 29, 1990, abandoned.

FIELD OF THE INVENTION

The present invention relates to adhesive compositions suitable for fiber reinforced rubber articles, particularly, to adhesive compositions having good adhesive properties with an industrial textile fiber cord for reinforcing rubber.

BACKGROUND OF THE INVENTION

A textile material is used in the form of a filament, chip, cord, cable, webbed cord or duck, as a reinforcing material for articles such as a tire, a cover belt, a hose and an air spring, It is essential for such a textile material to bond with the rubber strongly to satisfy its reinforcing purposes. So, it is not exaggeration to say that the strength of a reinforcing material for such purposes determines the lifetime of the resultant rubber product and various aspects of its intended performance.

Therefore, in order to bond a textile material with a rubber, an adhesive comprising a rubber latex, containing dispersed therein a resin having a strong bonding power effective for textiles, such as a resorcin-formaldehyde resin, a urea-formaldehyde resin and phenol derivative-formaldehyde resin, has been used. Most widely used among the above-mentioned resins is an adhesive with a resorcin-formaldehyde resin dispersed in a rubber latex.

As a rubber latex, a latex composed of a vinylpyridine-styrene-butadiene terpolymer, a latex of a styrene-butadiene copolymer, a natural rubber latex and other materials similar thereto have been widely used. Most commonly employed among them is a latex composed of a vinylpyridine-styrene-butadiene latex containing about 15 wt % of vinylpyridine, about 15 wt % of styrene and about 70 wt % of butadiene.

In methods commonly-employed with these adhesives, they are applied to a textile material and then heat-processed to bond the adhesive to the textile material. This processed textile material is then embedded in a compounded rubber and the two are bonded together through the vulcanization of the compound rubber.

An adhesive used as such is a rubber latex generally called a vulcanizable rubber adhesive.

However, the bonding strength of vinylpyridine-styrene-butadiene terpolymer latex as mentioned above to rubber tends to be lost if an attempt is made to increase the bonding strength for a textile material by changing the compositional ratio of a resin such as a resorcin-formaldehyde resin. Thus, the possibilities of improving the bonding strength of conventional adhesive are not very high.

As a result of the above, an adhesive is needed which achieves strong bonding with a rubber while keeping unimpaired its bonding strength with textiles.

Another fault of such vulcanized rubber adhesive is that the adhering forces vary greatly depending upon the vulcanizing temperatures used. That is, while rubber products are vulcanized at low temperature to satisfy various performance characteristics desired, the amount of heat applied during vulcanization varies depending upon the non-uniformity of products such as tires, in which the thickness varies. Consequently, non-uniform adhesion occurs in the resulting products. Therefore, sometimes difficulties in rubber-fiber adhesion occur, such as separation, at locations where insufficient heat is applied.

When products such as tires, conveyor belts, etc. are subjected to accelerated tests under far more severe use conditions than are actually employed in practical use so as to ensure that they fully withstand their specified maximum use life span, the above-mentioned difficulties tend to occur more frequently. In addition to the above, it is necessary that adhesives used for bonding fibrous materials to rubber exhibit excellent thermal and dynamic fatigue resistance.

Recently, tires have tended to become light weight to save energy and it has increasingly been required to improve the strength and modulus of the reinforcing materials in the tire against thermal or mechanical inputs and lengthen the like thereof until breakage. Thus, the bonding force between the fibrous material and the rubber must sufficiently be stable against stresses more than required during the life of a product. However, conventional adhesives which are a mixture of vinylpyridine-styrene-butadiene terpolymer latex and resorcin-formaldehyde resin, are not satisfactory and a deterioration in bonding under repeated high temperature and a dynamic high strain stresses occur.

For example, Japanese Patent Application (OPI) No. 58-2370 discloses a vinylpyridine-styrene-butadiene latex having double construction of the polymer therein in order to decrease the amount of vinylpyridine monomer which is costly and at the same time to improve adhesion. However, in this case, in particular, adhesion under high temperature has been insufficient.

As described above, it is desired to develop an ideal adhesive for fibrous materials for rubber articles, which have a higher initial adhesion, adhesion stability under various vulcanizing temperatures, good fatigue properties during continuous use at a high temperature and under dynamic high strain.

SUMMARY OF THE INVENTION

One object of the invention is to provide an adhesive which exhibits great improvements in both initial adhesion, adhesion when vulcanized at lower temperatures and adhesion under high temperatures.

It has now been found that by utilizing a latex prepared by a two stage polymerization of a vinylpyridine-styrene-butadiene copolymer and changing the ratio of the mixture of monomers to produce a specific composition having a double construction of the polymer, remarkable improvements can be achieved.

It has now been found that this and other objects of this invention are attained by an adhesive composition comprising a mixture of (1) a latex having a double construction of a vinylpyridine-styrene-butadiene terpolymer prepared by
   (A) polymerizing a monomer mixture comprising 30–60 wt % of styrene, 0.5–15 wt % of vinylpyridine and less than 60 wt % of butadiene and then sequentially
   (B) polymerizing a monomer mixture comprising 10–40 wt % of styrene, 5–20 wt % of vinylpyridine and 45–75 wt % of butadiene, and where the styrene content ratio on a percentage basis in (B) above is less than that in (A), and (2) 10–30 parts, on a solids basis, of a thermosetting resin based on 100 parts, on a solids basis, of the latex (1).

Hereafter, for convenience sake, the term "inner part" refers to a polymer obtained by polymerization (A) and the term "outer part" refers to a polymer obtained by polymerization (B).

DETAILED DESCRIPTION OF THE INVENTION

The present invention is now explained in more detail hereafter.

In the outer part of the terpolymer of the latex, if the content of vinylpyridine is less than 5 wt % adhesion of the rubber latex to textile become inferior and the failure strength between the rubber and the adhesive is reduces. Therefore, it unfavorably deteriorates initial adhesion and adhesion under high temperatures. While, if the vinylpyridine content is in excess of 20 wt %, the failure strength between the rubber and the adhesive become inferior and the adhesive itself become hard and brittle. Therefore, cohesive failure strength is reduced and, disadvantageously, adhesion when vulcanized at lower temperatures in addition to initial adhesion and adhesion under high temperature are degraded.

In the outer part of the terpolymer in the latex, if the content styrene is less than 10 wt %, the adhesive itself become soft and tensile strength is reduced. Therefore, cohesive failure strength is reduced and initial adhesion and an adhesion when vulcanized at lower temperatures are decreased. If the styrene content is in excess of 40 wt %, disadvantageously the ability to form an adhesive film on the fiber is reduced and then initial adhesion is deteriorated. Further, if the amount of butadiene is excess of 75 wt %, a fiber treated with the adhesive have a tendency to have lower adhesion especially with the passing of time and lower weather resistance. If the amount of butadiene is less than 45 wt %, the elasticity of the adhesive layer and flexibility at lower temperatures is disadvantageously reduced.

Next, in the inner part of the terpolymer of the latex, if the content of vinylpyridine exceeds 15 wt %, failure strength between the rubber and the adhesive is reduced and the adhesive itself become hard and brittle. Therefore, the cohesive failure strength of the adhesive is reduced and adhesion is decreased when vulcanized at lower temperature in addition to the initial adhesion and an adhesion under high temperature. If the amount of vinylpyridine is less than 0.5 wt %, adhesive bonding force to textiles is reduced and failure strength between textile and adhesive is degraded. From the view point above, the vinylpyridine content ratio as a percentage of the inner part of the terpolymer is 0.5–15 wt %, preferably 6–15 wt %, more preferably 10–15 wt %.

Further, if the styrene content is less than 30 wt %, an adhesive itself become soft and tensile strength is reduced. Therefore, cohesive failure strength is reduced and initial adhesion and adhesion under high temperature is degraded. While, if the styrene content is in excess of 60 wt %, the adhesive itself become hard and failure strength between the rubber and adhesive is reduced. Therefore, adhesion when vulcanized at lower temperatures in addition to initial adhesion and adhesion under high temperatures are reduced. From the view point above, the styrene content ratio as a percentage of the inner part of the terpolymer is 30–60 wt %, preferably 40–60 wt %, more preferably 46–55 wt %.

Furthermore, the styrene content of the inner part obtained by polymerization (A) is more than that of the outer part obtained by polymerization (B). Preferably, the styrene content on a percentage basis of inner part is more 25 wt %, more preferably 30 wt %, than that of the outer part.

The butadiene content of the inner part is less than 60 wt %, preferably less than 50 wt %.

If the amount of the thermosetting resin is less than 10 parts, on a solids basis, based on 100 parts of the latex on a solids basis, the resulting film of the resin is soft and a failure strength of the adhesive itself is reduced. While, if the amount of the thermosetting resin is in excess of 30 parts, the adhesive become hard and brittle, and can not be applied for use.

In the present invention, the ratio of inner part to outer part of terpolymer of in latex is preferably 50–80 parts by weight of inner part per 20–50 parts by weight of outer part.

The latex having a double construction of vinylpyridine-styrene-butadiene terpolymer in the latex is, for example, prepared by changing the charge ratio of the monomers during the polymerization. More specifically, to aqueous solution containing an emulsifying agent such as the potassium salt of rhodanic acid, a mixture of monomers which correspond to the inner part of the terpolymer, an electrolyte such as sodium phosphate and an initiator such as a peroxide are added. After the predetermined conversion ratio of the inner part of the terpolymer has been reached, a mixture of monomers corresponding to the outer part of the terpolymer are added. Then, after the predetermined conversion ratio in the outer part is reached, the polymerization reaction is stopped by a adding charge-transfer agent. Then, unreacted monomers are removed. The monomer ratio constituting the terpolymer is measured by an NMR (Nuclear Magnetic Resonance) method by converting the peak area of the chart into a composition ratio by weight.

In the present invention, aliphatic conjugated diene monomers such as 1,3-butadiene, 2-methyl-1,3-butadiene and mixtures thereof can be used as the butadiene component in the rubber latex.

Aromatic vinyl compounds such as styrene, α-methylstyrene, 2-methylstyrene, 3-methylstyrene, 4-methylstyrene, 2,4-diisopropylstyrene, 2,4-dimethylstyrene, 4-t-butylstyrene, hydroxmethylstyrene and mixtures thereof can be used as the styrene component in the rubber latex.

Examples of vinylpyridines, which can be used include 2-vinylpyridine, 3-vinylpyridine, 4-vinylpyridine, 2-methyl-5-vinylpyridine, 5-ethyl-2-vinylpyridine and mixtures thereof.

In the present invention, examples of resins which can be added to the rubber latex in order to bond with textile, include resorcin-formaldehyde resins, phenol-formaldehyde resins, urea-formaldehyde resins, melamine-formaldehyde resins such as 3,5-xylenol-formaldehyde resins, 5-methylresorcin-formaldehyde resins and mixtures thereof which is cured by heating or by adding a methylene donor at the same time.

Examples of the above-described resins include resorcin-formaldehyde condensates, preferably synthesized in the presence of an alkali catalyst, urea-formaldehyde condensates synthesized in the alkali catalyst and a mixture of resorcin-formaldehyde condensates synthesized in the presence of alkali catalyst and phenol derivative-formaldehyde condensates synthesized under acid or neutral conditions.

The adhesive composition of the present invention can be applied to all fibrous materials suitable for use in reinforcing rubber articles, for example, rayons, vinylon, aliphatic polyamide fibers, of which examples include 6-nylon, 6,6-nylon and 4,6-nylon, polyester fibers of which examples are polyethylene terephthalate and aromatic polyamide fibers of which examples include co-condensates of para-phenylenediamine and terephthalic acid chloride (KEVLAR, trade name, manufactured by Du Pont). Among them, aromatic polyamide fibers especially KEVLAR are most suitable for use by the present invention. Moreover, the adhesive composition of the present invention can be applied to the fibers such as polyester fibers and aromatic polyamide fibers pre-treated with phenol derivative-formaldehyde resin, epoxy compounds or isocyanate compounds during polymerization, spinning or aftertreatment, or fibers subjected previously to pretreatment with such a compound.

These fibrous materials can be in any form of codes, cables, textiles, ducks and filament chips.

The adhesive composition of the present invention can be advantageously applied to all rubber articles such as tires, belts, conveyor belts, hoses, air springs and the like. Application or coating of the adhesive composition can be carried out using conventional methods, for example, by immersing fibers in the adhesive liquid, by coating the fibers using by a doctor blade or brush, by spraying the fibers and by blowing the adhesive composition in a powered form against fibers.

The amount of the adhesive to be employed is preferably 1-15 parts by weight based on 100 parts by weight the fibrous material. The adhesive must be coated uniformly but the amount of the adhesive may be outside the range above-mentioned depending on ultimate end-use application.

The fibrous material treated with the adhesive of the present invention can be subjected to processings such as a heat treatment at 100°-250° C., exposure to electron beams, microwaving and exposure to a plasma after drying.

The present invention is now be explained in greater detail hereinafter by reference to the following specific examples, but the invention is not to be construed as being limited by the following examples. Unless otherwise indicated, all parts, percents and ratios are by weight.

Additionally, in the examples, the methods of evaluation of initial adhesion, initial adhesion when vulcanized at low temperature and adhesion under high temperature, were as follows:

Initial Adhesion Test

An adhesive-treated cord was burried in a vulcanizable compound rubber having the composition shown below.

|  | (parts by weight) |
|---|---|
| Natural Rubber (RSS#3) | 80.0 |
| Polyisoprene Rubber | 20.0 |
| Zinc Oxide | 5.0 |
| N-Phenyl-N-isopropyl-p-phenylenediamine (Antioxidant) | 1.0 |
| Stearic Acid | 2.0 |
| HAF Carbon Black | 50.0 |
| Aromatic Oil | 5.0 |
| Sulfur | 2.5 |
| Dibenzothiazylsulfide (accelerator) | 1.0 |
| Total | 166.5 |

Then, it was vulcanized at 155° C. and 20 kg/cm$^2$ for 20 minutes. The cord was dug out of the resulting vulcanized rubber and pealed therefrom at a rate of 30 cm/min, during which the resistance value was measured and designated initial adhesion.

Initial Adhesion Test When Vulcanized at Low Temperature

A vulcanized rubber was prepared and evaluated in the same manner as that for initial adhesion, except the vulcanization was at 125° C. for 100 minutes.

Adhesion Test under High Temperature

A vulcanized rubber was prepared and an evaluation was carried out in the same manner as that for initial adhesion except that the evaluation was carried out at 120° C.

EXAMPLE 1-18

An adhesive composition was prepared by mixing a latex of vinylpyridine-styrene-butadiene rubber latex (hereinafter refers to "rubber latex") having a composition shown in Table 1 below and the following resorcin-formaldehyde resin solution

|  | (parts by weight) |
|---|---|
| Water | 524.01 |
| Resorcin | 15.12 |
| Formaldehyde (37% aqueous solution) | 16.72 |
| Sodium Hydroxide (10% aqueous solution) | 110.00 |
| Total | 566.85 |

Specifically, the adhesive preparation was as follows.

After resorcin-formaldehyde resin solution as described above was aged for 8 hours, 433.15 parts of rubber latex (41% solution) as shown in Table 1 were added and then further aged for 16 hours to obtain an adhesive composition solution in accordance with the present invention. The solid content of the resin was 15 parts based on 100 parts of the rubber latex on a solids basis.

A cord of poly(1,4-phenyleneterephthalamide) (Trade name: KEVLAR manufactured by Du Pont) having a twist structure of 1500 d/2 obtained by twisting filament yarns of 1500 denier at a ply twist of 32 turns/10 cm and a cable twist of 32 turns/10 cm was used as a fibrous material. This cord was predipped into an aqueous solution containing an epoxy compound and then passed through a drying oven at 160° C. for 60 seconds and further at 240° C. for 60 seconds through a heat treating oven. After the treated cord was immersed into the adhesive composition solution, it was dried at 160° C. for 60 seconds and then heat-treated at 240° C. for 60 seconds. The initial adhesion, initial adhesion when vulcanized at low temperature, and adhesion under high temperature were evaluated by the method above-mentioned using this cord. The results obtained are shown in Table 1 below.

COMPARATIVE EXAMPLE 1-17

The treatment and evaluations were carried out in the same manner as described in Example 1 except that the latex shown in Table 1 below was used. The results obtained are shown in Table 1 below.

EXAMPLE 19 COMPARATIVE EXAMPLE 18

The treatment and evaluations were carried out in the same manner as described in Example 1 except that a rubber latex having a composition as shown in Table 2 and polyethyleneterephthrarate cord which was obtained by twisting 1500 denier raw yarns at 40 turns/10 cm for cable twisting and 40 turns/10 cm for ply twisting was used instead of the poly(1,4-phenylene terephthalamide) of Table 1. The cord was treated and evaluated in the same manner as described in Example 1. The results obtained are shown in Table 2 below.

EXAMPLE 20, COMPARATIVE EXAMPLE 19

The treatment and evaluations were carried out in the same manner as described in Example 1, except that a rubber latex shown in Table 2 and 6-nylon cord, instead poly(1,4-phenylene terephthalamide), which were obtained by twisting 1260 denier raw yarns at 39 turns/10 cm for cable twisting and 39 turns/10 cm for ply twisting, were used and using the following adhesive composition but without pretreatment with an epoxy compound.

|  | (parts by weight) |
|---|---|
| Water | 597.00 |
| Resorcin | 18.20 |
| Formaldehyde | 26.90 |
| (37% aqueous solution) | |
| Sodium Hydroxide | 6.60 |
| (10% aqueous solution) | |
| Rubber Latex | 351.30 |
| Total | 1,000.00 |

The results obtained are shown in Table 2 below.

EXAMPLE 21, COMPARATIVE EXAMPLE 20

The treatment and evaluations were carried out in the same manner as described in Example 17 except that the latex shown in Table 2 and rayon fibers instead of 6-nylon, twisted cord which was obtained by twisting 1650 denier raw yarns at 47 turns/10 cm for cable twisting and 47 turns/10 cm for ply twisting to form a construction of 1650 d/2 were used. The results obtained are shown in Table 2 below.

TABLE 1

|  | Comparative Example 1 | Comparative Example 2 | Example 1 | Comparative Example 3 | Example 2 | Comparative Example 4 | Example 3 |
|---|---|---|---|---|---|---|---|
| Composition of terpolymer in latex (wt %) | | | | | | | |
| Composition of inner part of terpolymer in latex | | | | | | | |
| Ratio of inner part | 40 | | 50 | | 60 | | 70 |
| Vinylpyridine | 12.5 | | 12.5 | | 12.5 | | 12.5 |
| Styrene | 50 | | 50 | | 50 | | 50 |
| Butadiene | 37.5 | | 37.5 | | 37.5 | | 37.5 |
| Composition of outer part of terpolymer in latex | | | | | | | |
| Ratio of inner part | 60 | | 50 | | 40 | | 30 |
| Vinylpyridine | 15 | | 15 | | 15 | | 15 |
| Styrene | 15 | | 15 | | 15 | | 15 |
| Butadiene | 70 | | 70 | | 70 | | 70 |
| Composition of total part of terpolymer in latex | | | | | | | |
| Vinylpyridine | 14 | 14 | 13.75 | 13.75 | 13.5 | 13.5 | 13.25 |
| Styrene | 29 | 29 | 32.5 | 32.5 | 36 | 36 | 39.5 |
| Butadiene | 57 | 57 | 53.75 | 53.75 | 50.5 | 50.5 | 47.25 |
| Fibrous material | KEVLAR | KEVLAR | KEVLAR | KEVLAR | KEVLAR | KEVLAR | KEVLAR |
| Cord construction (number of twists) | 1500d/2 (32 × 32) | 1500d/2 (32 × 32) | 1500d/2 (32 × 32) | 1500d/2 (32 × 32) | 1500d/2 (32 × 32) | 1500d/2 (32 × 32) | 1500d/2 (32 × 32) |
| Initial adhesion | 2.03 | 1.05 | 2.19 | 1.92 | 2.23 | 1.73 | 2.51 |
| Initial adhesion when vulcanized at low temperature | 1.47 | 1.37 | 1.53 | 1.21 | 1.79 | 0.79 | 2.06 |
| Adhesion under high temperature | 1.16 | 0.34 | 1.49 | 0.83 | 1.53 | 0.75 | 1.52 |

|  | Comparative Example 5 | Example 4 | Comparative Example 6 | Comparative Example 7 | Comparative Example 8 | Comparative Example 9 |
|---|---|---|---|---|---|---|
| Composition of terpolymer in latex (wt %) | | | | | | |
| Composition of inner part of terpolymer in latex | | | | | | |
| Ratio of inner part | | 80 | | 80 | | |
| Vinylpyridine | | 12.5 | | 12.5 | | |
| Styrene | | 50 | | 50 | | |
| Butadiene | | 37.5 | | 37.5 | | |
| Composition of outer part of terpolymer in latex | | | | | | |
| Ratio of inner part | | 20 | | 10 | | |
| Vinylpyridine | | 15 | | 15 | | |
| Styrene | | 15 | | 15 | | |
| Butadiene | | 70 | | 70 | | |
| Composition of total part of terpolymer in latex | | | | | | |
| Vinylpyridine | 13.25 | 13 | 13 | 12.75 | 12.75 | 15 |

TABLE 1-continued

| | | | | | | |
|---|---|---|---|---|---|---|
| Styrene | 39.5 | 43 | 43 | 46.5 | 46.5 | 15 |
| Butadiene | 47.25 | 44 | 44 | 40.75 | 40.75 | 70 |
| Fibrous material | KEVLAR | KEVLAR | KELVAR | KELVAR | KELVAR | KELVAR |
| Cord construction | 1500d/2 | 1500d/2 | 1500d/2 | 1500d/2 | 1500d/2 | 1500d/2 |
| (number of twists) | (32 × 32) | (32 × 32) | (32 × 32) | (32 × 32) | (32 × 32) | (32 × 32) |
| Initial adhesion | 1.65 | 2.29 | 1.40 | 1.93 | 0.84 | 2.13 |
| Initial adhesion when vulcanized at low temperature | 0.63 | 1.84 | 0.50 | 1.45 | 0.32 | 1.60 |
| Adhesion under high temperature | 0.55 | 1.54 | 0.41 | 1.07 | 0.29 | 0.42 |

| | Comp. Example 10 | Example 5 | Example 6 | Example 3 | Example 7 | Comp. Example 11 | Comp. Example 12 |
|---|---|---|---|---|---|---|---|
| Composition of terpolymer in latex (wt %) | | | | | | | |
| Composition of inner part of terpolymer in latex | | | | | | | |
| Ratio of inner part | 70 | 70 | 70 | 70 | 70 | 70 | 70 |
| Vinylpyridine | 12.5 | 12.5 | 12.5 | 12.5 | 12.5 | 12.5 | 0 |
| Styrene | 10 | 30 | 40 | 50 | 60 | 70 | 50 |
| Butadiene | 77.5 | 57.5 | 47.5 | 37.5 | 27.5 | 17.5 | 50 |
| Composition of outer part of terpolymer in latex | | | | | | | |
| Ratio of inner part | 30 | 30 | 30 | 30 | 30 | 30 | 30 |
| Vinylpyridine | 15 | 15 | 15 | 15 | 15 | 15 | 15 |
| Styrene | 15 | 15 | 15 | 15 | 15 | 15 | 15 |
| Butadiene | 70 | 70 | 70 | 70 | 70 | 70 | 70 |
| Fibrous material | KEVLAR | KEVLAR | KEVLAR | KEVLAR | KEVLAR | KEVLAR | KEVLAR |
| Cord construction | 1500d/2 | 1500d/2 | 1500d/2 | 1500d/2 | 1500d/2 | 1500d/2 | 1500d/2 |
| (number of twists) | (32 × 32) | (32 × 32) | (32 × 32) | (32 × 32) | (32 × 32) | (32 × 32) | (32 × 32) |
| Initial adhesion | 2.11 | 2.28 | 2.43 | 2.51 | 2.65 | 2.09 | 2.14 |
| Initial adhesion when vulcanized at low temperature | 1.55 | 1.83 | 2.00 | 2.06 | 1.95 | 1.33 | 1.65 |
| Adhesion under high temperature | 1.37 | 1.71 | 1.75 | 1.82 | 1.47 | 1.15 | 1.40 |

| | Example 8 | Example 9 | Example 10 | Example 3 | Example 11 | Comparative Example 13 | Comparative Example 14 |
|---|---|---|---|---|---|---|---|
| Composition of terpolymer in latex (wt %) | | | | | | | |
| Composition of inner part of terpolymer in latex | | | | | | | |
| Ratio of inner part | 70 | 70 | 70 | 70 | 70 | 70 | 70 |
| Vinylpyridine | 5.0 | 7.5 | 10.0 | 12.5 | 15.0 | 17.5 | 12.5 |
| Styrene | 50 | 50 | 50 | 50 | 50 | 50 | 50 |
| Butadiene | 45 | 42.5 | 40 | 37.5 | 35 | 32.5 | 37.5 |
| Composition of outer part of terpolymer in latex | | | | | | | |
| Ratio of inner part | 30 | 30 | 30 | 30 | 30 | 30 | 30 |
| Vinylpyridine | 15 | 15 | 15 | 15 | 15 | 15 | 15 |
| Styrene | 15 | 15 | 15 | 15 | 15 | 15 | 5 |
| Butadiene | 70 | 70 | 70 | 70 | 70 | 70 | 80 |
| Fibrous material | KEVLAR | KEVLAR | KEVLAR | KEVLAR | KEVLAR | KEVLAR | KEVLAR |
| Cord construction | 1500d/2 | 1500d/2 | 1500d/2 | 1500d/2 | 1500d/2 | 1500d/2 | 1500d/2 |
| (number of twists) | (32 × 32) | (32 × 32) | (32 × 32) | (32 × 32) | (32 × 32) | (32 × 32) | (32 × 32) |
| Initial adhesion | 2.21 | 2.50 | 2.55 | 2.51 | 2.32 | 2.00 | 2.05 |
| Initial adhesion when vulcanized at low temperature | 1.78 | 1.98 | 2.33 | 2.06 | 1.85 | 1.23 | 1.52 |
| Adhesion under high temperature | 1.50 | 1.45 | 1.57 | 1.82 | 1.43 | 1.05 | 1.13 |

| | Example 12 | Example 3 | Example 13 | Example 14 | Example 15 | Comparative Example 15 |
|---|---|---|---|---|---|---|
| Composition of terpolymer in latex (wt %) | | | | | | |
| Composition of inner part of terpolymer in latex | | | | | | |
| Ratio of inner part | 70 | 70 | 70 | 70 | 70 | 70 |
| Vinylpyridine | 12.5 | 12.5 | 12.5 | 12.5 | 12.5 | 12.5 |
| Styrene | 50 | 50 | 50 | 50 | 50 | 50 |
| Butadiene | 37.5 | 37.5 | 37.5 | 37.5 | 37.5 | 37.5 |
| Composition of outer part of terpolymer in latex | | | | | | |
| Ratio of inner part | 30 | 30 | 30 | 30 | 30 | 30 |
| Vinylpyridine | 15 | 15 | 15 | 15 | 15 | 15 |
| Styrene | 10 | 15 | 20 | 30 | 40 | 50 |
| Butadiene | 75 | 70 | 65 | 55 | 45 | 35 |

TABLE 1-continued

| Fibrous material | KEVLAR | KEVLAR | KEVLAR | KEVLAR | KEVLAR | KEVLAR |
|---|---|---|---|---|---|---|
| Cord construction | 1500d/2 | 1500d/2 | 1500d/2 | 1500d/2 | 1500d/2 | 1500d/2 |
| (number of twists) | (32 × 32) | (32 × 32) | (32 × 32) | (32 × 32) | (32 × 32) | (32 × 32) |
| Initial adhesion | 2.31 | 2.51 | 2.46 | 2.39 | 2.17 | 2.05 |
| Initial adhesion when vulcanized at low temperature | 1.81 | 2.05 | 1.97 | 1.88 | 1.63 | 1.38 |
| Adhesion under high temperature | 1.45 | 1.82 | 1.77 | 1.48 | 1.48 | 1.07 |

|  | Comparative Example 16 | Example 16 | Example 17 | Example 3 | Example 18 | Comparative Example 17 |
|---|---|---|---|---|---|---|
| Composition of terpolymer in latex (wt %) | | | | | | |
| Composition ratio of inner part of terpolymer in latex | | | | | | |
| Ratio of inner part | 70 | 70 | 70 | 70 | 70 | 70 |
| Vinylpyridine | 12.5 | 12.5 | 12.5 | 12.5 | 12.5 | 12.5 |
| Styrene | 50 | 50 | 50 | 50 | 50 | 50 |
| Butadiene | 37.5 | 37.5 | 37.5 | 37.5 | 37.5 | 37.5 |
| Composition ratio of outer part of terpolymer in latex | | | | | | |
| Ratio of inner part | 30 | 30 | 30 | 30 | 30 | 30 |
| Vinylpyridine | 2.5 | 5 | 10 | 15 | 20 | 25 |
| Styrene | 15 | 15 | 15 | 15 | 15 | 15 |
| Butadiene | 82.5 | 80 | 75 | 70 | 65 | 60 |
| Fibrous material | KEVLAR | KEVLAR | KEVLAR | KEVLAR | KEVLAR | KEVLAR |
| Cord construction | 1500d/2 | 1500d/2 | 1500d/2 | 1500d/2 | 1500d/2 | 1500d/2 |
| (number of twists) | (32 × 32) | (32 × 32) | (32 × 32) | (32 × 32) | (32 × 32) | (32 × 32) |
| Initial adhesion | 2.10 | 2.21 | 2.42 | 2.51 | 2.15 | 2.02 |
| Initial adhesion when vulcanized at low temperature | 1.53 | 1.97 | 2.03 | 2.06 | 1.62 | 1.28 |
| Adhesion under high temperature | 1.33 | 1.49 | 1.75 | 1.82 | 1.45 | 1.10 |

TABLE 2

|  | Example 19 | Example 18 | Example 20 | Comparative Example 19 | Example 21 | Comparative Example 20 |
|---|---|---|---|---|---|---|
| Composition of terpolymer in latex (wt %) | | | | | | |
| Composition of inner part of terpolymer in latex | | | | | | |
| Ratio of inner part | 70 | | 70 | | 70 | |
| Vinylpyridine | 12.5 | | 12.5 | | 12.5 | |
| Styrene | 50 | | 50 | | 50 | |
| Butadiene | 37.5 | | 37.5 | | 37.5 | |
| Composition of outer part of terpolymer in latex | | | | | | |
| Ratio of inner part | 30 | | 30 | | 30 | |
| Vinylpyridine | 15 | | 15 | | 15 | |
| Styrene | 15 | | 15 | | 15 | |
| Butadiene | 70 | | 70 | | 70 | |
| Composition of total part of terpolymer in latex | | | | | | |
| Vinylpyridine | 13.25 | 13.25 | 13.25 | 13.25 | 13.25 | 13.25 |
| Styrene | 39.5 | 39.5 | 39.5 | 39.5 | 39.5 | 39.5 |
| Butadiene | 47.25 | 47.25 | 47.25 | 47.25 | 47.25 | 47.25 |
| Fibrous material | Polyethylene terephthalate | Polyethylene terephthalate | 6-Nylon | 6-Nylon | Rayon | Rayon |
| Cord construction | 1500d/2 | 1500d/2 | 1260d/2 | 1260d/2 | 1650d/2 | 1650d/2 |
| (number of twists) | (40 × 40) | (40 × 40) | (39 × 39) | (39 × 39) | (47 × 47) | (47 × 47) |
| Initial adhesion | 2.88 | 2.40 | 2.67 | 2.32 | 3.06 | 2.60 |
| Initial adhesion when vulcanized at low temperature | 2.73 | 2.23 | 2.48 | 2.25 | 2.79 | 2.29 |
| Adhesion under high temperature | 2.31 | 1.97 | 2.11 | 1.77 | 2.28 | 1.76 |

As is clear from the results in Tables 1 and 2 above, the adhesive compositions according to the present invention containing a rubber latex having double construction of specifically designated composition of vinylpyridine-styrene-butadiene terpolymer had remarkably improved initial adhesion, initial adhesion when vulcanized at low temperature and adhesion under high temperature.

While the invention has been described in detail and with reference to specific embodiments thereof, it will be apparent to one skilled in the art that various changes and modifications can be made therein without departing from the spirit and scope thereof.

What is claimed is:

1. An adhesive composition comprising a mixture of (1) a latex having a double construction of vinylpyridine-styrene-butadiene terpolymer, prepared by
  (A) polymerizing a first monomer mixture comprising 46–55 wt % of a styrene-based aromatic vinyl compound, 0.15–15 wt % of a vinylpyridine compound and less than 50 wt % of a butadiene component and then
  (B) polymerizing a second monomer mixture comprising 10–40 wt % of a styrene-based aromatic vinyl compound, 5–20 wt % of a vinylpyridine compound and 45–75 wt % of a butadiene component in the presence of the polymerized first monomer mixture, wherein the styrene content by percentage in (B) is less than that in (A), and
(2) 10–30 parts on a solids basis of a thermosetting resin based on 100 parts on a solids basis of said latex (1).

2. The adhesive composition of claim 1, wherein the ratio of the polymerized monomer mixture (A) to the polymerized monomer mixture (B) is 50 to 80 parts by weight of the polymerized monomer mixture (A) per 20 to 50 parts by weight of the polymerized monomer mixture (B).

3. The adhesive composition of claim 1, wherein the styrene is an aromatic composition of claim 1, wherein the styrene is an aromatic vinyl compound selected from the group consisting of styrene-based aromatic vinyl compound, α-methylstyrene, 2- ethylstyrene, 3-methylstyrene, 4-methylstyrene, 2,4-diisopropylstyrene, 2,4-dimethylstyrene, 4-t-butylstyrene, hydroxymethylstyrene and mixtures thereof.

4. The adhesive composition of claim 1, wherein the vinylpyridine compound is selected from the group consisting of 2-vinylpyridine, 3-vinylpyridine, 4-vinylpyridine, 2-methyl-5-vinylpyridine, 5-ethyl-2-vinylpyridine and mixtures thereof.

5. The adhesive composition of claim 1, wherein the thermosetting resin is a resorcin-formaldehyde resin, a phenol-formaldehyde resin, a urea-formaldehyde resin, a melamine-formaldehyde resin and mixtures thereof.

6. The adhesive composition of claim 1, wherein the butadiene component is selected from the group consisting of aliphatic conjugated diene monomers.

7. The adhesive composition of claim 6, wherein the aliphatic conjugated diene monomers are selected from the group consisting of 1,3-butadiene, 2-methyl-1,3-butadiene and mixtures thereof.

8. The adhesive composition of claim 1, wherein the amount of the vinylpyridine compound in the first monomer mixture is 6 to 15 wt %.

9. The adhesive composition of claim 1, wherein the amount of the vinylpyridine compound in the first monomer mixture is 10 to 15 wt %.

10. The adhesive composition of claim 1, wherein the amount of the styrene-based aromatic vinyl compound in the first monomer mixture is more than the amount of styrene-based aromatic vinyl compound in the second monomer mixture.

11. The adhesive composition of claim 10, wherein the amount of the styrene-based aromatic vinyl compound in the first monomer mixture is 25 wt % more than the amount of the styrene-based aromatic vinyl compound in the second monomer mixture.

12. The adhesive composition of claim 10, wherein the amount of the styrene-based aromatic vinyl compound in the first monomer mixture is 30 wt % more than the amount of the styrene-based aromatic vinyl compound in the second monomer mixture.

13. The adhesive composition of claim 5, wherein the melamine-formaldehyde resin is selected from the group consisting of 3,5-xylenol-formaldehyde resin and 5-methyl resorcin-formaldehyde resin.

14. The adhesive composition of claim 5, wherein the thermosetting resin is selected from the group consisting of resorcin-formaldehyde condensates, urea-formaldehyde condensates and a mixture of resorcin-formaldehyde condensates and phenol derivative-formaldehyde condensates.

* * * * *